(12) United States Patent
Watanuki et al.

(10) Patent No.: US 6,389,856 B1
(45) Date of Patent: May 21, 2002

(54) LOCK APPARATUS

(75) Inventors: Yoshio Watanuki; Tetsuyuki Tsukano; Satoshi Ogata, all of Kanagawa-ken (JP)

(73) Assignees: Nissan Motor Co., Ltd.; Alpha Corporation, both of Kanagawa-ken (JP)

( * ) Notice: Subject to any disclaimer, the term of this patent is extended or adjusted under 35 U.S.C. 154(b) by 0 days.

(21) Appl. No.: 09/588,476

(22) Filed: Jun. 7, 2000

(30) Foreign Application Priority Data

Jun. 11, 1999 (JP) .......................................... 11-165451
Jun. 11, 1999 (JP) .......................................... 11-165463

(51) Int. Cl.[7] .............................................. G05G 5/00
(52) U.S. Cl. ............................. 70/186; 70/184; 70/185; 70/186; 70/252; 70/278.3; 70/278.2; 70/389; 70/408
(58) Field of Search ........................ 70/186, 252, 184, 70/185, 278.2, 278.3, 408, 389

(56) References Cited

U.S. PATENT DOCUMENTS

| 3,708,032 | A | * | 1/1973 | Suzuki | 180/287 |
| 3,782,145 | A | * | 1/1974 | Wolter | 70/186 |
| 3,789,636 | A | * | 2/1974 | Nakashima | 70/252 |
| 4,427,967 | A | * | 1/1984 | Maiocco | 340/52 |
| 4,466,262 | A | * | 8/1984 | Maiocco et al. | 70/252 |
| 4,716,748 | A | * | 1/1988 | Watanuki et al. | 70/252 |
| 5,117,097 | A | * | 5/1992 | Kimura et al. | 235/439 |
| 5,982,295 | A | * | 11/1999 | Goto et al. | 340/825.54 |
| 6,003,349 | A | * | 12/1999 | Nagae et al. | 70/186 |
| 6,095,415 | A | * | 8/2000 | Shouji | 235/449 |
| 6,223,571 | B1 | * | 5/2001 | Rector | 70/276 |

* cited by examiner

Primary Examiner—B. Dayoan
Assistant Examiner—Carlos Lugo
(74) Attorney, Agent, or Firm—McDermott, Will & Emery

(57) ABSTRACT

A lock apparatus includes: a control unit carrying out transmission and reception of an electronic signal between the electronic key and the control unfit so as to perform ID verification; a rotating member disposed rotatably inside a casing; a lock actuator receiving a lock release signal from the control unit so as to release a lock on the rotating member to the casing; a key insertion hole disposed to the rotating member; a slider hole going through the rotating member; a slider inserted into the slider hole and disposed such that its inner end is protruded into the key insertion hole; and a check lever supported rotatably and in which one end thereof is an operating portion activating the transmission and reception of the control unit and the other end makes contact with the outer end face of the slider. An outer end face of the slider is submerged from the external peripheral face of the rotating member when the electronic key is not inserted or inserted incompletely, and the slider is pushed by an insertion portion of the electrical key and slid outward when the electronic key is inserted normally, so that the outer end face makes flush with the external peripheral face of the rotating member. When the rotating member is rotated by the, electronic key, the other end of the check lever is moved from the outer end face of the slider to the external peripheral face of the rotating member.

13 Claims, 16 Drawing Sheets

LOCK APPARATUS

BACKGROUND OF THE INVENTION

The present invention relates generally to a lock apparatus, and more particularly to a lock apparatus which can be preferably applied to automobile steering by using an electronic key preferably.

According to considerations of the inventors of the present invention, there is an automobile steering lock apparatus as shown in FIGS. 18, 19.

In FIG. 18, reference numeral 40 denotes a rotator and reference numeral 41 denotes a rotator casing. Reference numeral 42 denotes a lock solenoid for engaging or disengaging a stopper 43 with or from an engaging groove 44 so as to lock or unlock a rotation of the rotator 40.

A slider hole 46 is provided in a lower portion of the rotator 40 such that it goes therethrough up to a key insertion hole 45. The slider 47 is disposed in the slider hole 46 such that it is freely slidable in a direction perpendicular to the key insertion hole 45.

A switch lever 49 is swingably supported by a pin 50 in a bottom portion of a housing 48 and an end of the switch lever 49 is urged upward by a spring 51, so that the slider 47 is pushed upward by this end. Consequently, a top end of the slider 47 is protruded into the key insertion hole 45.

Further, a key presence/absence detecting switch 52 having an actuating element 53 opposing the other end of the switch lever 49 is disposed in the bottom portion of this housing 48.

If an insertion portion 55 of an electronic key 54 is inserted into the key insertion hole 45, the slider 47 is moved downward. Consequently, pressing of the actuating element 53 by the other end of the switch lever 49 is released, so that the key presence/absence detecting switch 52 is turned ON.

The electronic key 54 contains a circuit chip 56 which memorizes a predetermined identity code (ID).

An annular antenna coil 57 is provided around an end portion of the housing.

With such a structure, when the insertion portion 55 of the electronic key 48 is inserted into the key insertion hole 45 and then, the key presence/absence detecting switch 52 is turned ON, the control unit 60 shown in FIG. 10 carries out transmission and reception of electronic signal by electric wave between the antenna coil 57 and circuit chip 56 so as to verify ID of the electronic key 54 with ID memorized in the control unit 60. Only when the IDs coincide with each other, a lock release signal is sent from the control unit 60 to the lock solenoid 42 so as to release the lock on the rotator 40. At the same time, a driving permission signal is sent to an engine driving control unit 61 so as to enable a startup of the engine.

In such a steering lock apparatus, only when the IDs coincide, a rotation of the rotator 40 is enabled and an ignition switch 62 is turned ON (starter switch is actuated). Consequently, the driving permission signal is sent to the driving control unit 61 so as to enable the startup of the engine. Thus, when other key than the electronic key 54 is used, not only the rotation of the rotator but also the startup of the engine is blocked thereby contributing to prevention of stealing of a vehicle.

SUMMARY OF THE INVENTION

However, with the above described structure, when the slider 47 is pushed down by the insertion portion 55 even when the electronic key 20 is inserted incompletely, the key presence/absence detecting switch 52 is turned ON, so that the lock solenoid 42 is operated to release the lock. Thus, in such a case, the rotation of the rotator 40 is made free, so that the rotation of the ignition switch and releasing of the steering lock are enabled.

Thus, the present invention intends to provide a steering lock apparatus wherein when the electronic key is inserted incompletely, even when the lock on the rotating member by the lock actuator is released, the rotation of the rotating member by the electronic key and releasing of the steering lock can be blocked effectively so as to encourage the electronic key to be inserted appropriately.

To achieve the above object, according to an aspect of the present invention, there is provided a lock apparatus capable of being locked and unlocked by an electronic key, comprising: an electronic key having a circuit chip generating an electronic signal and an insertion portion formed at an end thereof; a control unit disposed on the lock apparatus and carrying out transmission and reception of an electronic signal between the electronic key and the control unit so as to perform ID verification, the control unit sending a lock release signal when as a result of the ID verification, an ID of the control unit and an ID of the electronic key coincide with each other; a casing disposed on the lock apparatus and having a first opening portion; a rotating member disposed rotatably inside the casing; a lock actuator receiving the lock release signal from the control unit so as to release a lock on the rotating member with respect to the casing; a key insertion hole disposed to the rotating member and capable of transmitting a rotation force of the electronic key to the rotating member when the insertion portion of the electronic key is inserted and engaged therewith; a first slider hole going through the rotating member in a direction perpendicular to the key insertion hole from an external peripheral face of the rotating member toward the key insertion hole; a first slider inserted into the first slider hole and disposed such that an inner end thereof is protruded into the key insertion hole, an outer end face thereof being submerged from the external peripheral face of the rotating member when the electronic key is not inserted or inserted incompletely, and the first slider being pushed by the insertion portion and slid outward when the electronic key is inserted normally, so that the outer end face makes flush with the external peripheral face of the rotating member; and a first check lever supported rotatably by the casing and in which one end thereof is an operating portion activating the transmission and reception of the control unit for the ID verification and the other end makes contact with the outer end face of the first slider through the first opening portion in the casing so as to transmit a sliding motion of the first slider to the one end of the first check lever, while when the rotating member is rotated by the electronic key, the other end of the first check lever is moved from the outer end face of the first slider to the external peripheral face of the rotating member and makes contact with the external peripheral face in slidable.

According to another aspect of the present invention, there is provided an electronic lock apparatus, in which transmission and reception of an electronic signal is carried out between a circuit chip that generates an electronic signal and provided in an electronic key and a control unit that is disposed on the lock apparatus so as to perform ID verification, and when as a result of the ID verification, an ID of the control unit and an ID of the electronic key coincide with each other, a lock release signal is sent from the control unit to a lock actuator so that a rotating member of the electric lock apparatus becomes capable of being unlocked to enable a rotation of the rotating member by the electronic key, comprising: a casing accommodating the rotating member rotatably; a key insertion hole disposed to the rotating member and capable of transmitting a rotation force of the electronic key to the rotating member when an insertion portion of the electronic key is inserted and engaged therewith; a slider hole going through the rotating member in a direction perpendicular to the key insertion hole from an external peripheral face of the rotating member to the key insertion hole; a slider inserted into the slider hole and disposed such that an inner end thereof is protruded into the key insertion hole, an outer end face thereof being submerged from an external peripheral face of the rotating member when the electronic key is not inserted or inserted incompletely, and the slider being pushed by the insertion portion and slid outward when the electronic key is inserted normally, so that the outer end face makes flush with the external peripheral face of the rotating member; and a check lever supported rotatably outside the casing and in which one end thereof is an operating portion activating the transmission and reception of the control unit for the ID verification and the other end makes contact with the outer end face of the slider through an opening portion in the casing so as to transmit a sliding motion of the slider to the one end of the check lever, while when the rotating member is rotated by the electronic key, the other end of the check lever is moved from the outer end face of the slider to the external peripheral face of the rotating member and makes contact with the external peripheral face in slidable.

DETAILED DESCRIPTION OF THE PREFERRED EMBODIMENTS

Hereinafter, the preferred embodiments of the lock apparatus of the present invention will be described in detail with reference to the accompanying drawings.

First, the lock apparatus of a first embodiment of the present invention will be described with reference to FIGS. 1 to 8.

Figure 1:
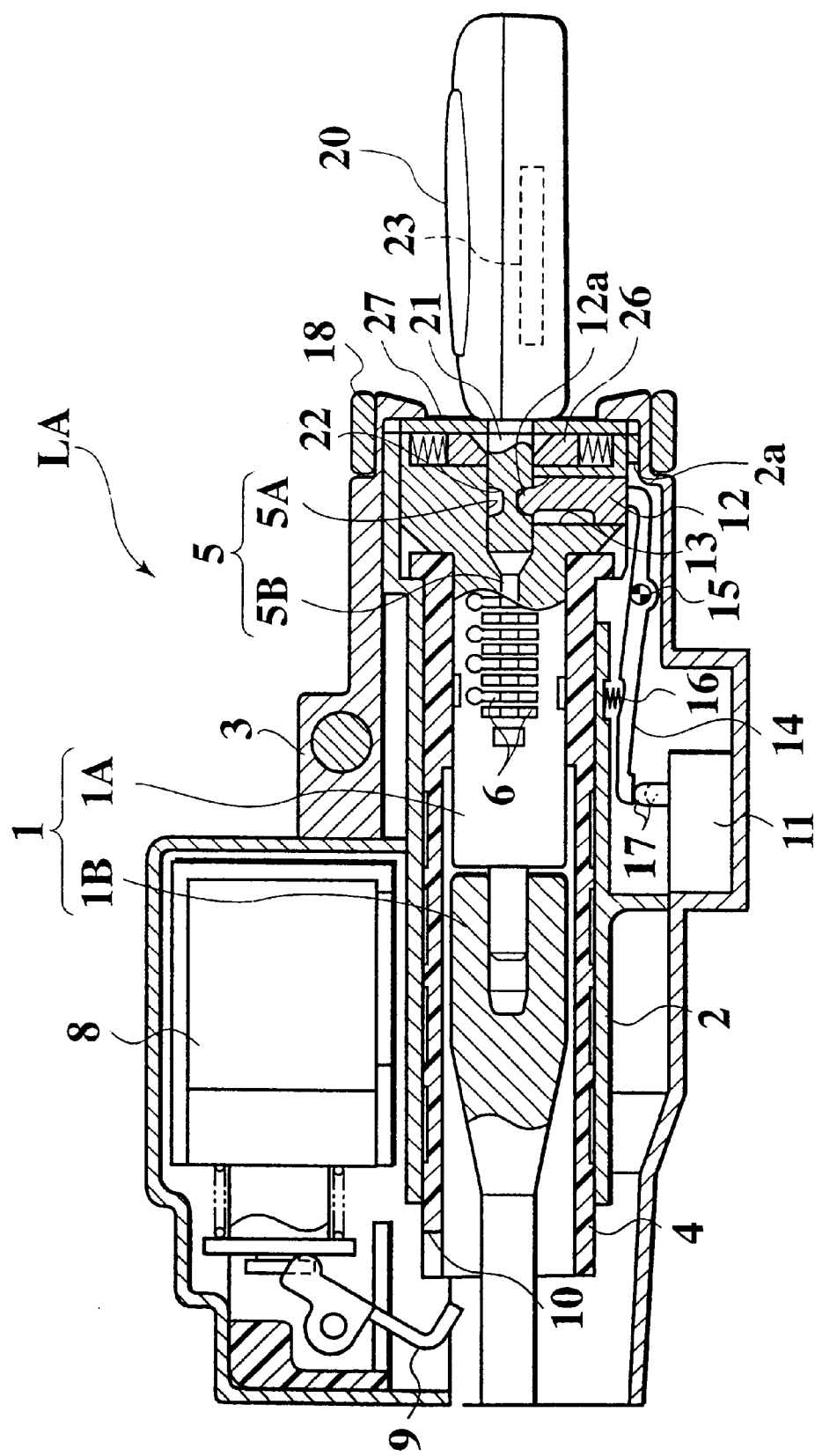
FIG. 1 is a sectional view showing a lock apparatus of a first embodiment of the present invention.

As shown in FIG. 1, in the lock apparatus LA, reference numeral 1 denotes a rotating member driven by rotating an ignition switch, reference numeral 2 denotes a cylinder casing and reference numeral 3 denotes a housing on which the cylinder casing 2 is fixed.

The rotating member 1 comprises a key cylinder 1A and a rotator 1B. The rotator 1B is connected to the key cylinder 1A unrotatably through their ends.

The key cylinder 1A has a small diameter portion which is inserted rotatably into the sleeve 4 which is disposed 35 rotatably in the cylinder casing 2.

A key insertion hole 5 of the key cylinder 1A is comprised of an electronic key insertion hole 5A in which an insertion portion 21 of an electronic key 20 (see FIG. 7A) is to be inserted and a mechanical key insertion hole 5B which is formed continuously with a deep portion of the electronic key insertion hole 5A.

The key cylinder 1A has a plurality of tumblers 6 which advance and retreat from/to a peripheral face of the mechanical key insertion hole 5B corresponding to removal and insertion of the mechanical key 25 (see FIG. 7B) from/into the mechanical key insertion hole 5B. A relation between the mechanical key 25 and tumbler 6 is the same as that of an ordinary key cylinder mechanism.

Figure 6A:
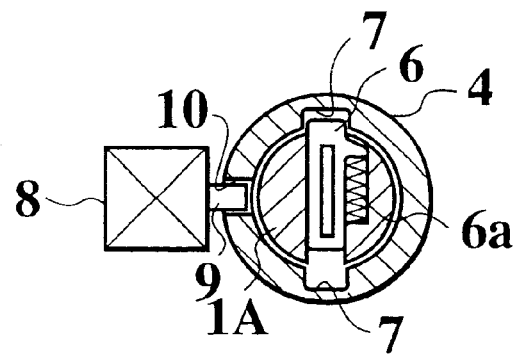
FIGS. 6A to 6C are operating condition diagrams showing a relation between the key cylinder and sleeve according to the embodiment.
Figure 6B:
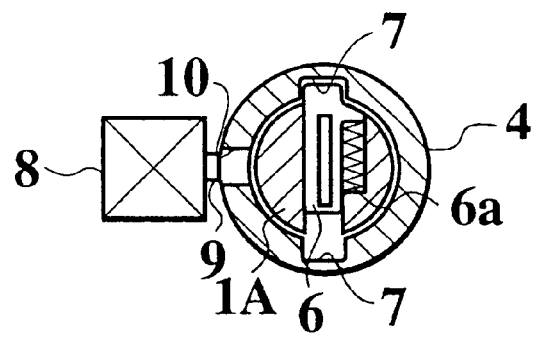
Figure 6C:
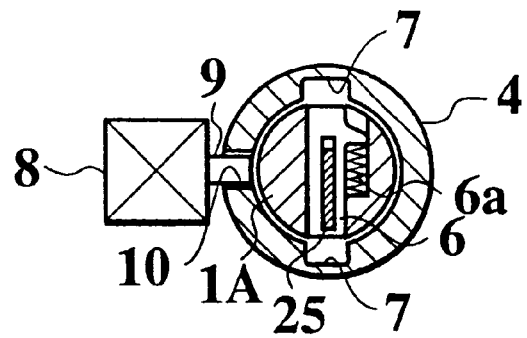
Figure 7A:
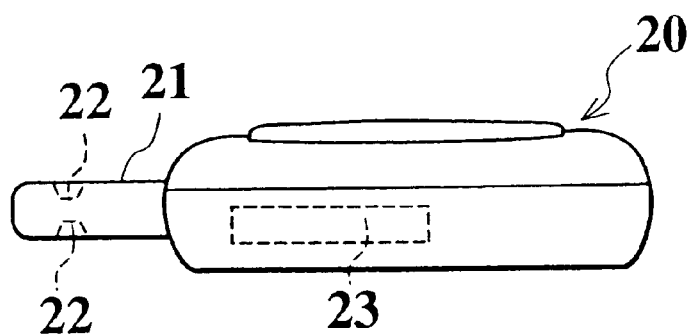
FIGS. 7A to 7C are explanatory diagrams showing the electronic key and mechanical key according to the embodiment.
Figure 7B:
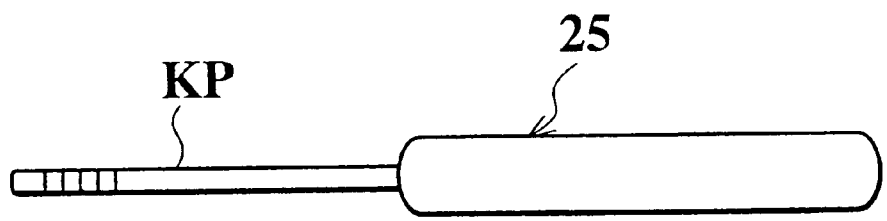
Figure 7C:
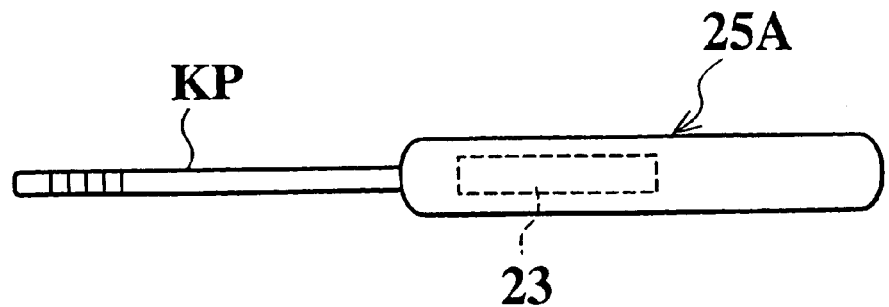

As shown in FIGS. 6A to 6C, tumbler engaging grooves 7 which the tumblers engage and disengage from are formed in an inner peripheral face of the sleeve 4. Corresponding to engagement and disengagement between the tumbler 6 and tumbler engaging groove 7, connection and disconnection between the sleeve 4 and key cylinder 1A are carried out.

Reference numeral 8 denotes a solenoid which is a lock actuator disposed in a upper portion of the housing 3. The lock solenoid 8 engages or disengages a stopper 9 with/from a lock groove 10 provided in the sleeve 4 so as to lock/ unlock a rotation of the sleeve 4.

Reference numeral 11 denotes a key presence/absence detecting switch which is a sensor for detecting presence or absence of a key, disposed in a lower portion of the housing 3. The key presence/absence detecting switch 11 detects whether or not a key is inserted into the key insertion hole 5A or 5B of the key cylinder 1A. A first slider 12 connects with the key presence/absence detecting switch 11 as a key detecting member.

The cylinder casing 2 is disposed such that an inner peripheral face thereof opposes an outer peripheral face of the large diameter portion of the key cylinder 1A across a minute gap.

A first slider hole 13 is provided in a lower portion of the large diameter portion of the key cylinder 1A such that it goes through a middle position in an axial direction of the electronic key insertion hole 5A. The first slider 12 is disposed in the first slider hole 13 such that a contact portion 12a which is a tip thereof is protruded into the electronic key insertion hole 5A and freely slidable in a direction perpendicular to the electronic key insertion hole 5A.

When the electronic key 20 is not inserted or inserted incompletely, a tip of the first slider 12 is protruded into the key insertion hole 5A and an outer end face thereof is submerged from an outer peripheral face of the key cylinder 1A. If the insertion portion 21 of the electronic key 20 is inserted up to an appropriate position as described later, the first slider 12 is pushed by the insertion portion 21 so that the outer peripheral face thereof makes flush with an outer peripheral face of the key cylinder 1A. A sliding motion of the tip of the first slider 12 into the key insertion hole 5A in the protruding direction is restricted by a difference of step between the first slider 12 and first slider hole 13.

A first check lever 14 for communicating with the first slider 12 and key presence/absence detecting switch 11 is disposed in the lower portion of the housing 3.

An intermediate portion of the first check lever 14 is swingably supported by a pin 15 and a rotation force thereof in a single direction is urged by a spring 16. The first check lever 14 is disposed such that an end thereof is in contact with an actuating element of the key presence/absence detecting switch 11 to serve for an operating portion. Further, the first check lever is disposed such that the other end thereof is in contact with an outer end face of the first slider 12 through a first opening portion 2a provided in the cylinder casing 2.

If the insertion portion 21 of the electronic key 20 is inserted into the key insertion hole 5A or the key plate KP of the mechanical key 25 is inserted into the mechanical key insertion hole 5B, the first slider 12 is pushed outward and then, the first check lever 14 transmits a sliding motion of the first slider 12 from the other end to an end, so that pressing of the actuating element 17 is released so as to turn ON the key presence/absence detecting switch 11. If the key cylinder 1A is rotated in a condition that the outer peripheral face of the first slider 12 makes flush with the outer peripheral face of the key cylinder 1A, the other end of the first check lever 14 is moved from the outer peripheral face of the first slider 12 to an outer peripheral face of the key cylinder 1A and makes contact therewith in slidable.

Figure 5:
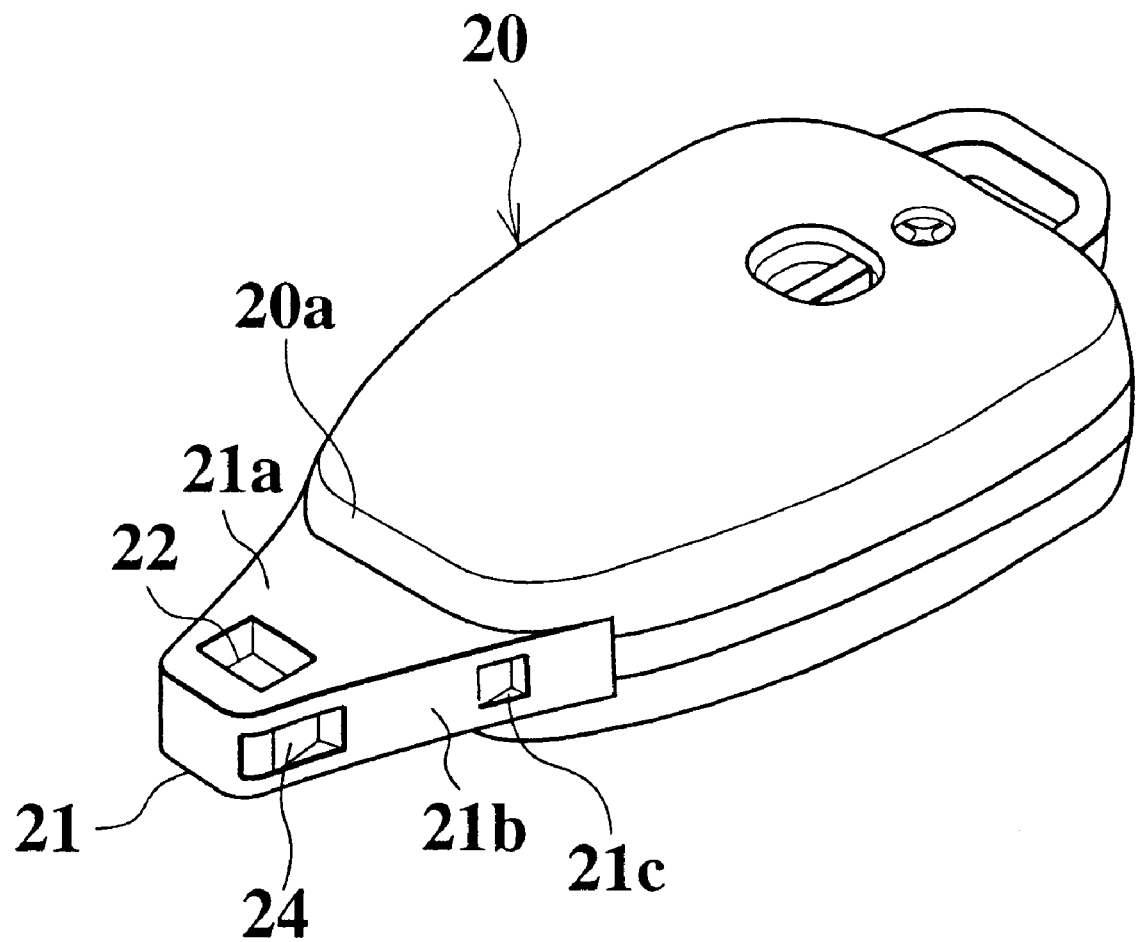
FIG. 5 is a perspective view of an electronic key according to the embodiment.

The insertion portion 21 of the electronic key 20 is shaped in a flat block comprising a pair of opposing flat portions 21a and slant portions 21b on both sides having a tapered tip as shown in FIG. 5. The insertion portion 21 is symmetrical with respect to a center line in the length direction and its section is rectangular.

Figure 2A:
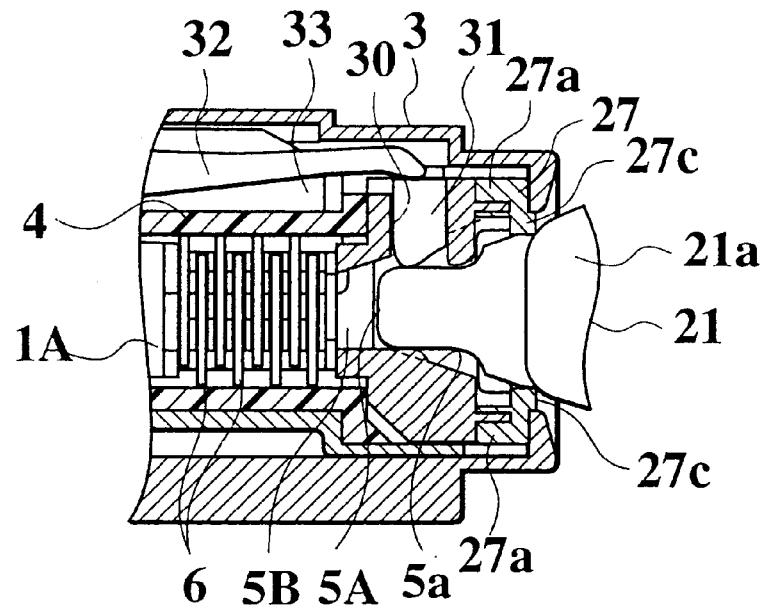
FIG. 2A is a sectional view of a key insertion hole forming portion as viewed in plan when the same electronic key is inserted normally according to the embodiment.

On the other hand, the key insertion hole 5A of the key cylinder 1A has an opening whose section is rectangular as shown in FIGS. 2A, B and 4A, B so as to facilitate insertion of the electronic key 20 and further, it is formed larger than a tip of the insertion portion 21. An interior of the insertion portion 21 is formed in a flat shape narrowing as it goes to the front by providing with slanted walls 5a on both side faces corresponding to the flat shape of the insertion portion 21. As a result, the key insertion hole 5A makes contact with the insertion portion 21 of the electronic key 20 through the entire faces, so that a rotation force of the electronic key 20 can be transmitted to the key cylinder 1A securely.

The key insertion hole 5A has a flat shape symmetrical with respect to a length axis thereof corresponding to the insertion portion 21. The first slider 12 of the key presence/ absence detecting switch 11 goes through a bottom face of the key insertion hole 5A corresponding to an opposing flat portion 21a of the insertion portion 21 so that it is protruded from the bottom face of the key insertion hole 5A.

A concave portion 22 which the first slider 12 engages or disengages from is formed in the opposing flat portion 21a of the insertion portion 21 of the electronic key 20. When the insertion portion 21 is inserted into the key insertion hole 5A completely, the tip 12a of the first slider 12 engages the concave portion 22, so as to prevent the electronic key 20 from slipping out when the key cylinder 1A is rotated.

The thickness of the concave portion 22 is set substantially the same as the thickness of the key plate portion KP of the mechanical key 25. When the key is inserted properly with the tip 12a of the first slider 12 engaging the concave portion 22, the outer end face of the first slider 12 makes flush with the outer end face of the large diameter portion of the key cylinder 1A.

The second slider hole 30 is provided so as to go through one slanted wall 5a of the key insertion hole 5A and a second slider 31 is disposed in the second slider hole 30 such that it is freely slidable in a direction perpendicular to the key insertion hole 5A.

More specifically, the second slider 31 is disposed at a phase different by 90° in the rotation direction from the aforementioned first slider 12. A tip of the second slider 31 is protruded into the key insertion hole 5A so that it comes into contact with the slanted portion of the insertion portion 21 of the electronic key 20 or a side edge of the key plate portion KP of the mechanical key 25. Then, when the second slider slides, the second check lever 32 is actuated as described later so as to lock or unlock the steering shaft (not shown).

When the electronic key 20 or the mechanical key 25 is not inserted or the electronic key 20 or the mechanical key 25 is inserted incompletely so that the insertion portion 21 or key plate portion KP does not reach the second slider 31, an outside end face of the second slider 31 is submerged from an external peripheral face of the large diameter portion of the key cylinder 1A. If the electronic key 20 or the mechanical key 25 is inserted normally, the second slider 31 is pushed by the insertion portion 21 or the key plate portion KP so that it is slide. Consequently, the outer end face thereof makes flush with the external peripheral face of the large diameter portion of the key cylinder 1A.

Because the width of the insertion portion 21 of the electronic key 20 and the width of the key plate portion KP of the mechanical key 25 are set substantially the same, the second slider 31 can be slid appropriately even when any key is used.

On the other hand, in the cylinder casing 2, a groove portion 33 as a second window portion is formed by flanging groove edges outward in an axial direction of the cylinder casing. A second check lever 32 is accommodated and held in the groove portion 33.

An intermediate portion of the second check lever 32 is swingably supported by the cylinder casing 2 and held freely rotatably. Then, the second check lever 32 is urged so that an end thereof is brought into contact with an outside end face of the second slider 31 by a spring (not shown). If the second slider 31 is slide outward up to a position in which the outer end face thereof makes flush with the external peripheral face of the large diameter portion of the key cylinder 1A and an end of the second check lever 32 is pushed by a predetermined stroke, the other end engages a lock member for locking a rotation of the steering shaft, so that the steering shaft is turned into a condition that it can be unlocked.

A block portion 34 is provided on the second slider hole 30 of the key cylinder 1A. The block portion 34 is located sideways of an end of the second check lever 32 which is in contact with the outside end face of the second slider 31, which is submerged from the external peripheral portion of the key cylinder 1A, when the electronic key 20 is not inserted or incompletely inserted and protruded so as to be capable of fitting to an side face of an end of the second check lever 32 when an ignition switch of the key cylinder 1A is turned in the ON direction (rotation in a direction of an arrow A in FIG. 3).

Accompanied by the provision of the block portion 34 on the slider 30, a recess groove 35 for the block portion 34 is formed correspondingly in the second slider 31.

According to this embodiment, because the lock member for locking or unlocking a rotation of the steering shaft (not shown) is disposed, a disposition axis of the groove portion 33 in the cylinder casing 2 and the second check lever 32 is set to have a predetermined opening angle θ in a rotation direction of the key cylinder 1A with respect to a slide axis of the second slider 31. Thus, a width L of the groove portion 33 is set sufficiently larger than the thickness t of the check lever 32, so that when the block portion 34 is fit to a side face of an end of the second check lever 32, an end of the second check lever 32 is permitted to be moved swingingly appropriately in the groove portion 33. The side face of an end of the second check lever 32 is capable of making a facial contact with a side face of the block portion 34.

In FIG. 1, reference numeral 26 denotes a shutter and reference numeral 27 denotes a cylinder cap.

A pair of leg portions 27a protruded backward are formed on the cylinder cap 27. The leg portions 27a engage a pair of cutout concave portions 5b provided in an outer peripheral face of the large diameter portion of the key cylinder 1A. An outer periphery front of the cylinder cap 27 is covered by the casing 3, so that the cylinder cap 27 rotates integrally with the key cylinder 1A and is prevented from dropping forward.

An opening 27b communicating with the key insertion hole 5A is provided in the cylinder cap 27 and a pair of protrusions 27c are protruded into the opening 27b.

Correspondingly, a pair of contact portions 21c are provided in the slope portion 21b of the insertion portion 21 of the electronic key 20. When the electronic key 20 is inserted completely, the protrusions 27c make contact with the contact portions 21c.

A grip side face 20a of the electronic key 20 makes contact with a concave portion 27d on each of both sides of the opening 27b of the cylinder cap 27.

The electronic key 20 incorporates a circuit chip 23 which memorizes a predetermined identity code (ID).

An end portion of the housing 3 has an annular antenna coil 18 as a detector for an electronic signal dispatched from the electronic key 20, the antenna coil being provided around that portion.

Figure 8:
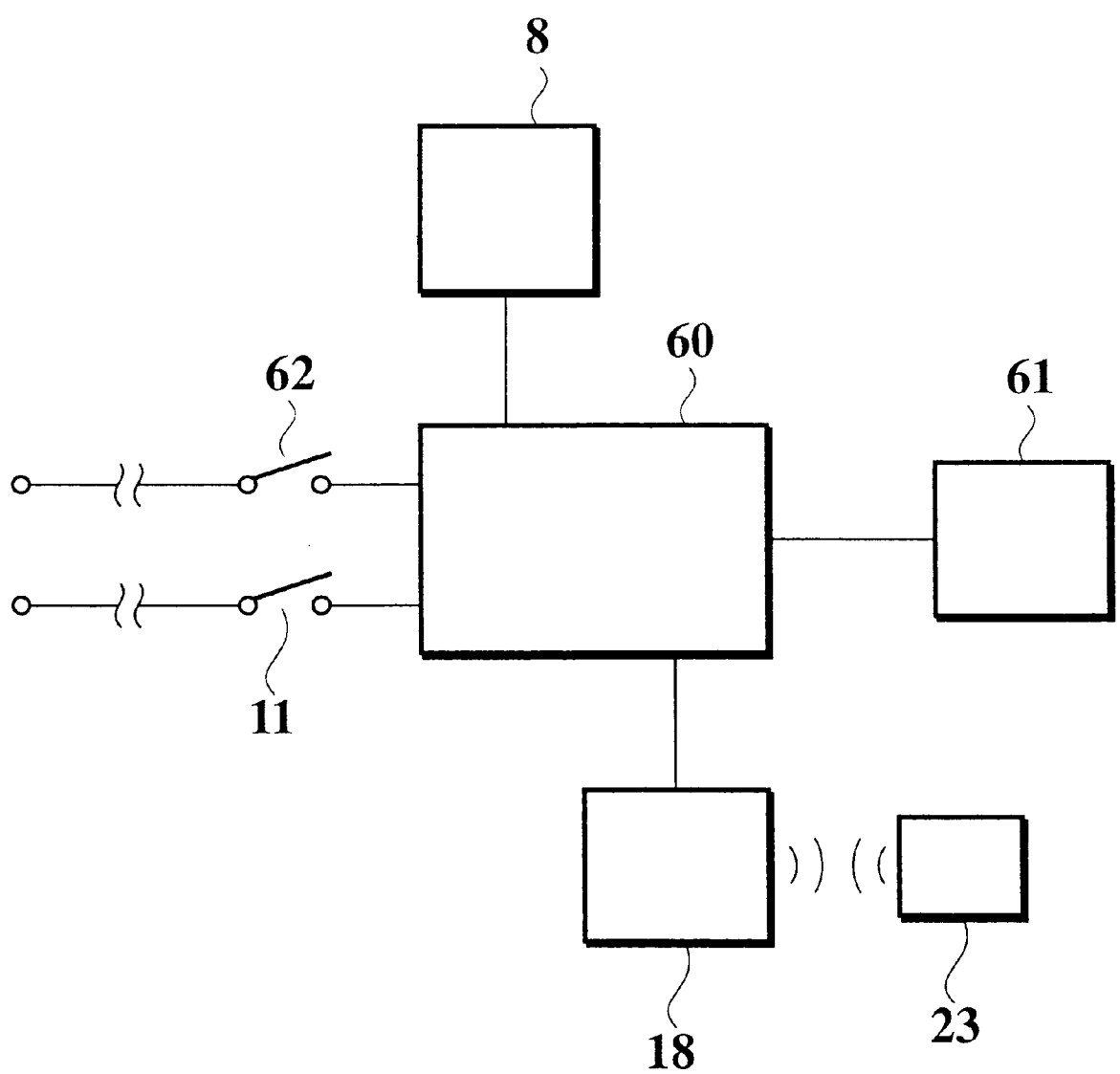
FIG. 8 is a block diagram of an electric circuit according to the embodiment.

In electric circuit structure according to this embodiment, as shown in FIG. 8, a key cylinder lock solenoid 8, a key presence/absence detecting switch 11, an antenna coil 18, a driving control unit 61, and an ignition switch 62 are connected to a control unit 60. Transmission and reception of a predetermined electric signal are carried out between the antenna coil 18 and the circuit chip 23 of the electronic key 20.

An operation of this embodiment will be described in detail.

First, in normal condition, a startup operation of an engine is carried out by the electronic key 20.

If the insertion portion 21 of the electronic key 20 is inserted into the key insertion hole 5A of the key cylinder 1A, the first slider 12 is pushed so as to turn ON the key presence/absence detecting switch 11. Then, the control unit 60 generates an electric field in the antenna coil so as to carry out transmission and reception of electronic signal between the circuit chip 23 of the electronic key 20 and the antenna coil 18.

Next, correspondingly, the control unit 60 carries out transmission and reception of electronic signal between the circuit chip 23 of the electronic key 20 and antenna coil 18 so as to verify ID memorized in the circuit chip 23 with ID memorized in the control unit 60.

Then, when both the IDs coincide with each other, the control unit 60 generates an engine driving permission signal and at the same time, the control unit 60 sends a lock release signal to the key cylinder lock solenoid 8. The stopper 9 is moved from a condition shown in FIG. 6A to a condition shown in FIG. 6B, namely, in which it is released from the lock groove 10, so that the sleeve 4 is unlocked.

On the other hand, when the electronic key 20 is inserted into the key insertion hole 5A, as shown in FIG. 2A, the second slider 31 is slid to push up an end of the second check lever 32, so that the lock member of a steering shaft (not shown) is turned into a condition in which it is capable of being unlocked.

When the electronic key 20 is inserted into the key insertion hole 5A like this, as shown in FIG. 6B, an end of the tumbler 6 of the key cylinder 1A engages the tumbler engaging groove 7 of the sleeve 4 by a spring force of the tumbler spring 6a.

Thus, when the electronic key 20 is turned with this condition, the key cylinder 1A is rotated integrally with the sleeve 4, the lock on the steering shaft by the lock member is released and at the same time, the ignition switch 62 is turned ON by the rotation of the key cylinder 1A (starter switch is actuated). Consequently, the control unit 60 sends a driving permission signal to the engine driving control unit 61 so as to start the engine.

If a supply of electric power to the control unit 60 is disabled because the battery goes dead or other reason, unlocking operation of the lock solenoid 8 by the electronic key 20 is disabled.

That is, the steering shaft remains locked so that the steering operation is disabled. In such a case, when, as shown in FIG. 6C, the key plate KP of the mechanical key 25 or the IMMOBI key (immobilization key) 25A (see FIG. 7C) incorporating the circuit chip 23 In its key head is inserted into the mechanical key insertion hole 5B of the key cylinder 1A, the tumbler 6 is submerged into the key cylinder 1A so as to release an engagement with the sleeve 4, so that the rotation of the key cylinder 1A is made free. At the same time, the second slider 31 is slide by the mechanical keys 25, 25A so as to push an end of the second check lever 32. Consequently, the lock member is turned into a condition in which it is capable of being unlocked by the other end.

Thus, by rotating the key cylinder 1A by means of the mechanical key 25 or 25A, the lock on the steering shaft (not shown) can be released so that the steering operation is enabled. That is, for example, a vehicle can be moved to a desired place by operating the steering at an emergency.

Figure 2B:
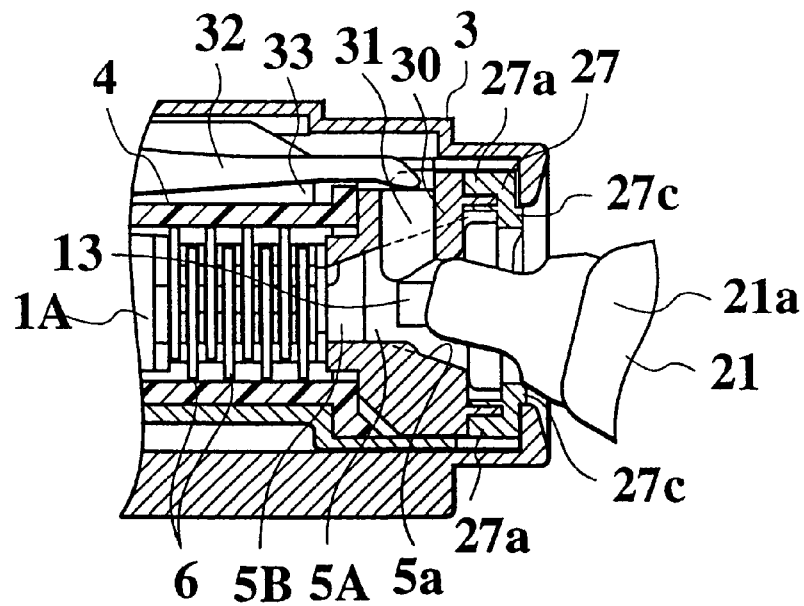
FIG. 2B is a sectional view of the key insertion hole forming portion as viewed in plan when the electronic key is inserted incompletely according to the embodiment.
Figure 3:
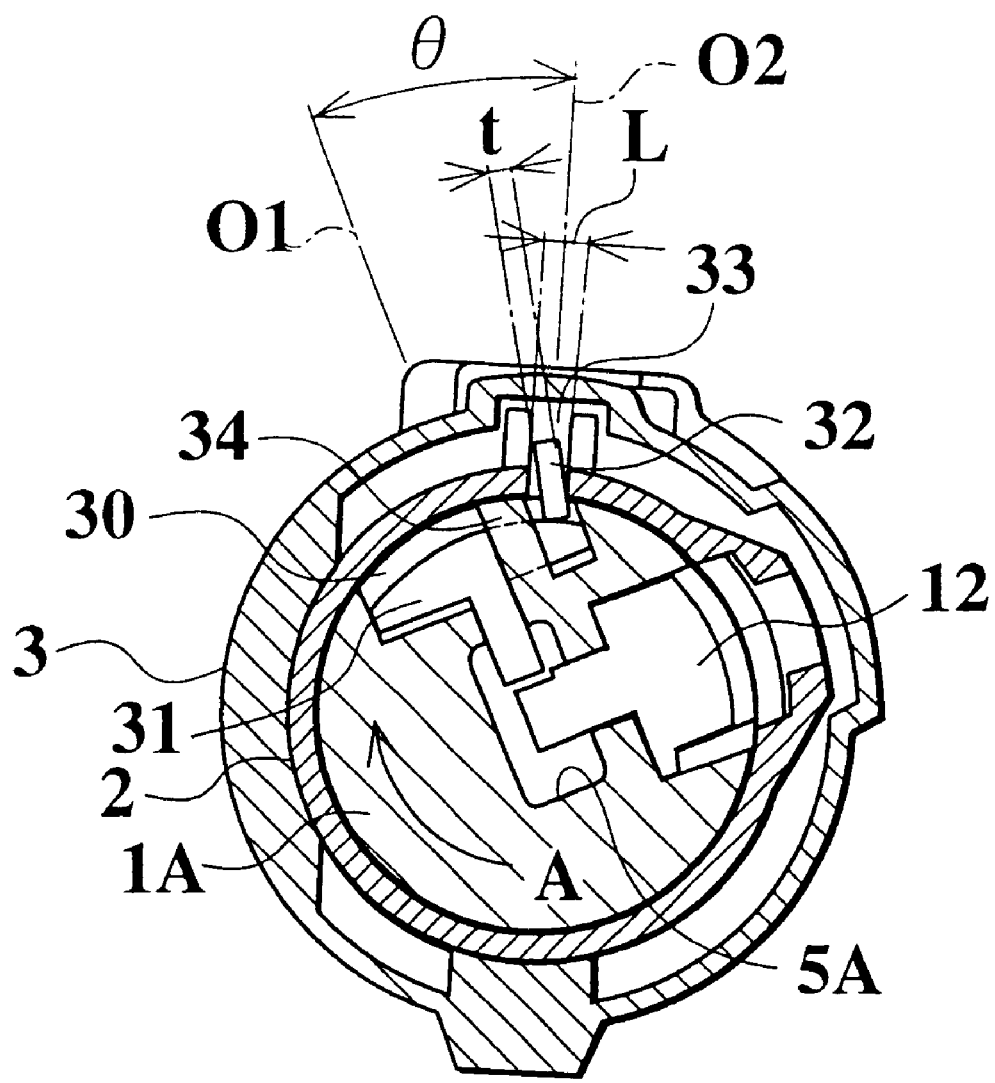
FIG. 3 is a longitudinal sectional view of a slider disposing portion shown with a second check lever disposing portion facing upward for convenience according to the embodiment.
Figure 4A:
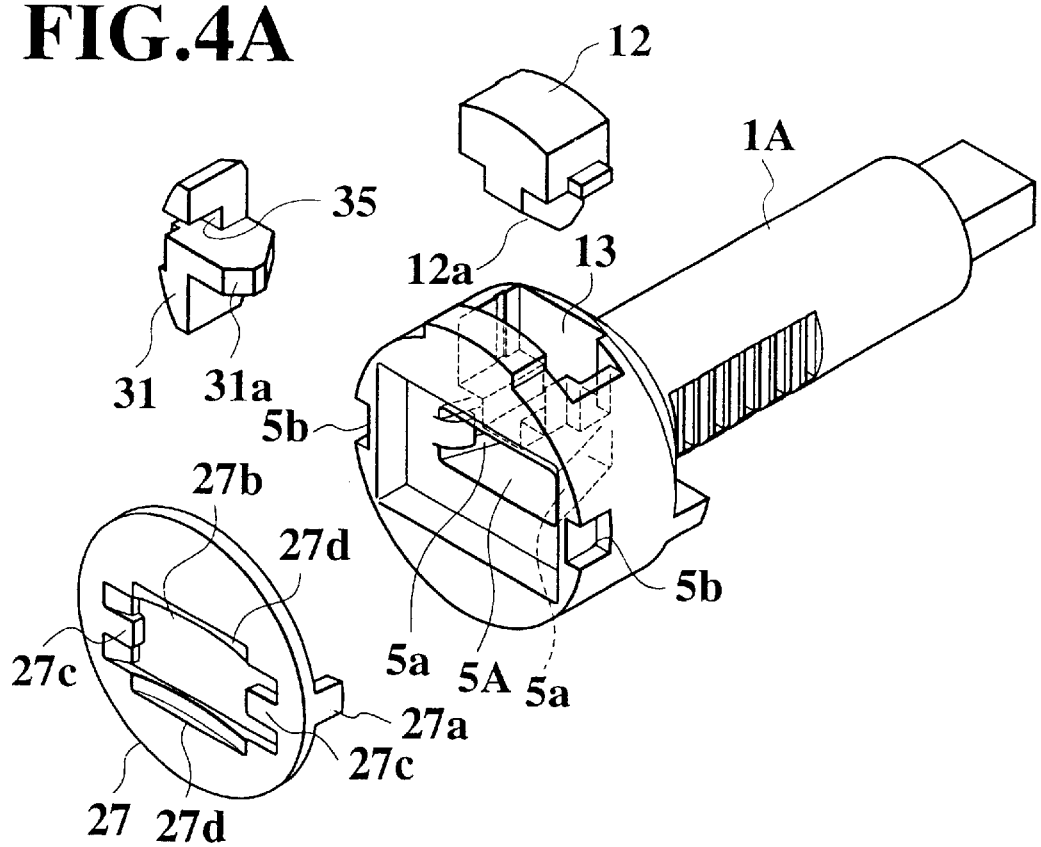
FIGS. 4A, 4B are disassembly perspective views showing a relation between a key cylinder and first/second sliders, indicating views obtained from different directions according to the embodiment.
Figure 4B:
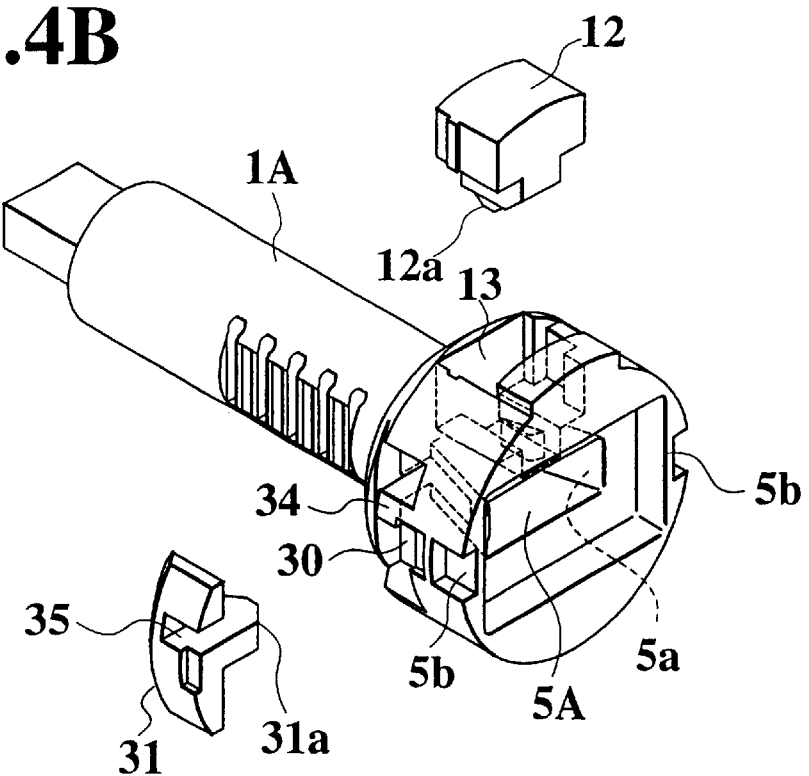

If the engine is started by the electronic key 20 as described above, when the electronic key 20 is inserted incompletely as shown in FIG. 2B, an end of the second check lever 32 is in contact with an outer end face of the second slider 31 submerged from the external peripheral face of the large diameter portion of the key cylinder 1A as shown in FIG. 3 such that it is positioned across the groove portion 33 of the cylinder casing 2 and the second slider hole 30.

The block portion 34 exists on the side of an end of the second check lever 32.

Thus, when the ID of the electronic key 20 coincides and the lock on the key cylinder 1A by the lock solenoid 8 is released, even when the key cylinder 1A is tried to be rotated in a direction of ignition switch ON by the electronic key 20, the block portion 34 collides with an end of the second check lever 32 so as to block such a rotating operation.

Therefore, according to the structure of this embodiment, it is possible to avoid unlocking of the steering lock and engine start in a condition that the electronic key 20 is inserted incompletely effectively, so as to encourage the electronic key 20 to be inserted appropriately.

According to this embodiment, even when, because the lock member for locking or unlocking a rotation of the steering shaft (not shown) is disposed, an end of the second check lever 32 is so disposed that its disposition, axis $O_2$ is set to have a predetermined opening angle θ in a rotation direction of the key cylinder with respect to a slide axis $O_1$ of the second slider 31, the width L of the groove portion 33 is set sufficiently larger than the thickness t of the check lever 32, so that the end of the second check lever 32 is permitted to be moved swingingly in the groove portion 33. Thus, when a side face of the block portion 34 comes into contact with an inner edge on the side face of the second check lever 32 of the block 34 when the electronic key 20 is turned in its incomplete insertion condition, the end thereof is moved swingingly in the groove portion 33, so that the side face of the end of the second check lever 32 makes a facial contact with the side face of the block portion 2.

Therefore, a movement of the end of the second check lever 32 in a direction in which it tries to disengage (outward) is blocked, so that the rotation of the electronic key 20 with the electronic key inserted incompletely can be prevented securely.

Although according to this embodiment, the key cylinder 1A is applied to the rotating member 1 so that the steering lock can be released by means of the mechanical key 25 instead of the electronic key 20 when the battery goes dead, of course, it is permissible to so construct that the rotating member can be rotated by only the electronic key 20.

Although, according to this embodiment, the circuit chip 23 of the electronic key 20 sends or receives ID signal to/from the antenna coil 18 through electronic wave, the present invention is not restricted to this example, but electromagnetic wave such as infrared ray can be used as a signal carrier for transmission and reception, and the ID signal may be sent or received to/from the infrared ray sensor.

Next, a lock apparatus according to a second embodiment of the present invention will be described with reference to mainly FIGS. 9A to 16C.

A basic structure of this embodiment is the same as the first embodiment. Like reference numerals are attached to the same components and a description thereof is omitted or simplified appropriately.

Keys for use in this embodiment are an electronic key 20, mechanical key 20 and mechanical key 25A like the first embodiment. An electric circuit structure is the same as the first embodiment. The insertion portion 21 of the electronic key 20 does not have to be of tapered flat shape and it will be described on the basis of a simple rectangular structure. Its basic structure is substantially the same as the first embodiment while the concave portions are provided in the same manner. Further, the key insertion hole 5A in the key cylinder 1A has a shape corresponding to the insertion portion 21.

According to this embodiment, the second slider 31 is set to such a timing that the second slider 31 comes into contact with the insertion portion 21 later than the first slider 12 comes into contact with the insertion portion 21 in an insertion process of the electronic key 20.

Setting of time lag in the slider operating timing of the first slider 12 and second slider 31 can be considered in various ways.

For example, in cases shown in FIGS. 9A to 14B, the second slider 31 is disposed deeper in the key insertion hole 5A than the first slider 12 so as to set up a time lag.

Figure 15A:
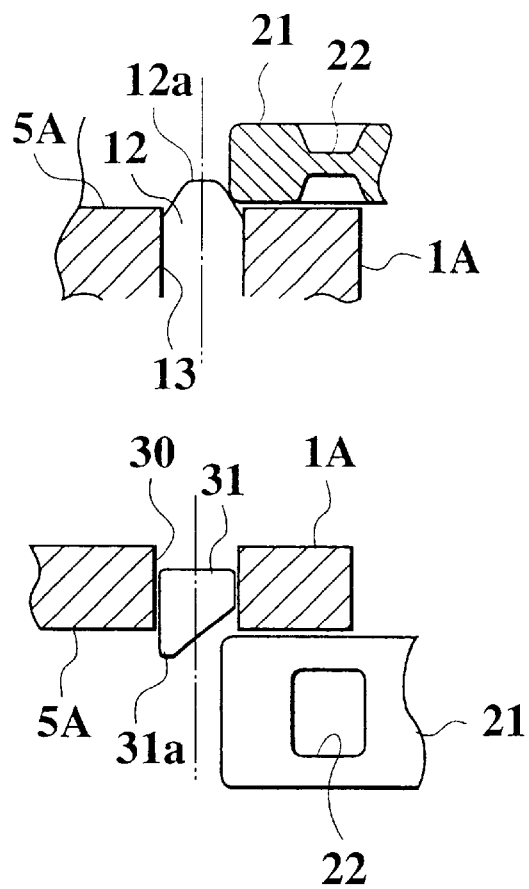
FIG. 15A is a schematic explanatory diagram showing a second example of delay setting of slider operation timing between the first slider and second slider according to the embodiment, FIG. 15B similarly shows a schematic explanatory diagram showing a third example, FIG. 15C similarly shows a schematic explanatory diagram showing a fourth example and FIG. 15D similarly shows a schematic explanatory diagram showing a fifth example.

According to other methods, as shown in FIG. 15A, the first and second sliders 12, 31 are disposed at the same depth position of the key insertion hole 5A. Then, a gradient of an inclination of a contact surface on a tip 12a of the first slider 12 is made different from the gradient of the inclination of the contact surface at the tip 31a of the second slider 31.

Figure 15B:
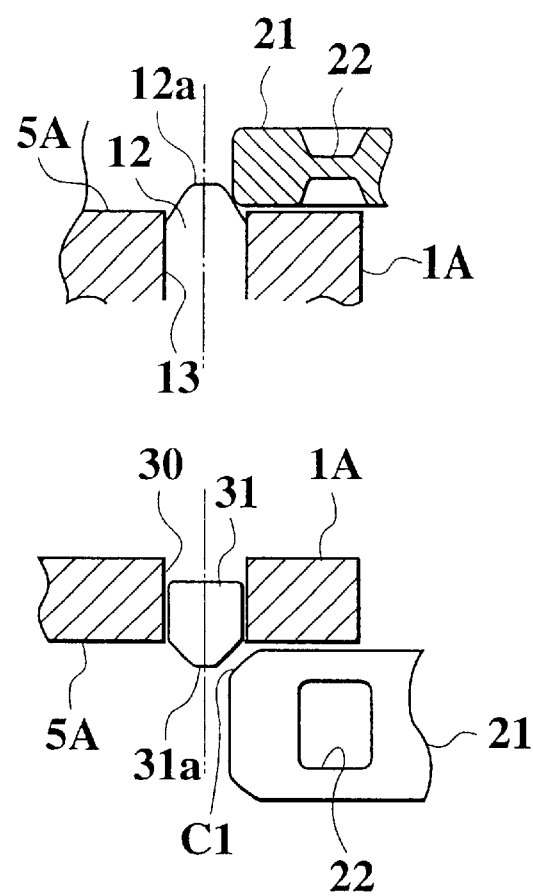

Alternatively, as shown in FIG. 15B, an inclined chamfered portion C1 is provided at a portion which comes into contact with the second slider 31 at a tip of the insertion portion 21 of the electronic key 20, so that the tip of the insertion portion 21 comes into contact with the second slider 31 later than it comes into contact with the first slider 12. In any case, by setting a contact start position between the first slider 12 and insertion portion 21 deeper in the key insertion hole 5A, than the contact start position between the second slider 31 and insertion portion 21, the aforementioned time lag setting can be carried out simply in mechanical terms.

Figure 15C:
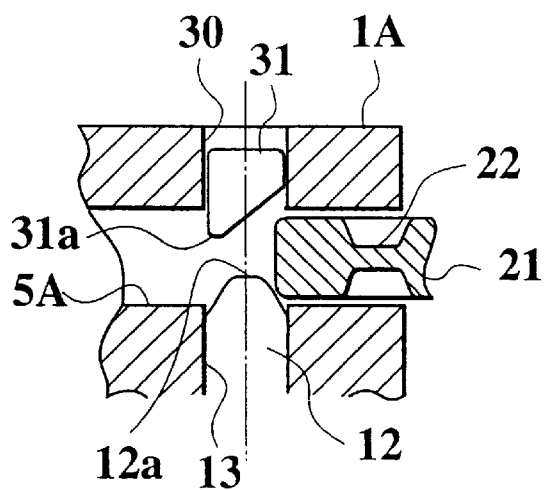
Figure 15D:
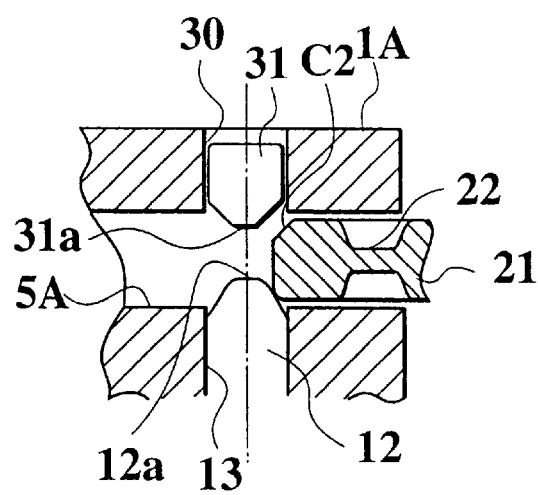

The examples shown in FIGS. 15A and 15B indicate cases where the first slider 12 and second slider 31 are shifted by 90° in phase with respect to each other in the rotation direction of the key. In case where both of them are disposed at different phases by 180° with respect to each other, the aforementioned time lag setting can be carried out simply by providing the contact surfaces at the tips 12a, 31a of the first and second sliders 12, 31 with different gradients as shown in FIG. 15C or providing a portion coming into contact with the second slider 31 at a tip of the insertion portion 21 with an inclined chamfered portion C2.

An operation of this embodiment will be described in detail.

First, in normal condition, a startup operation of an engine is carried out by the electronic key 20.

Figure 9A:
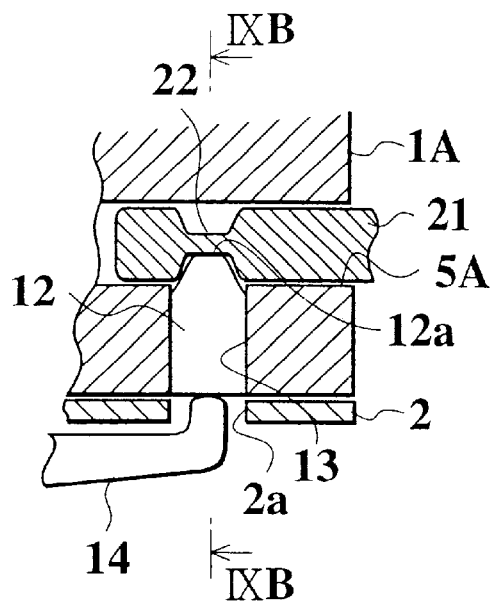
FIG. 9A is a sectional view schematically showing electronic key insertion condition of a lock apparatus of a second embodiment of the present invention around the first slider disposing portion and FIG. 9B is a sectional view taken along the lines IXB to IXB of FIG. 9A.
Figure 9B:
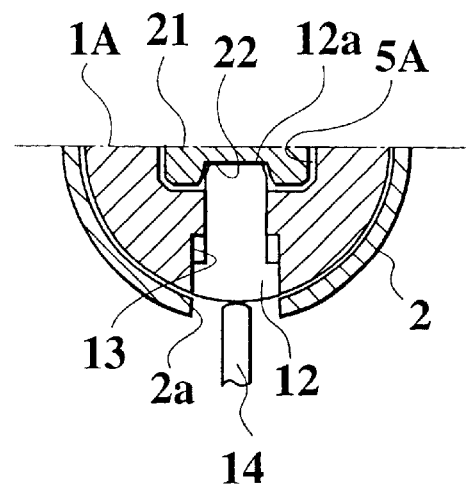

If the insertion portion 21 of the electronic key 20 is inserted into the key insertion hole 5A of the key cylinder IA appropriately as shown in FIGS. 9A and 9B, the first slider 12 is pushed so as to turn ON the key presence/absence detecting switch 11. Then, the control unit 60 generates an electric field in the antenna coil.

Next, transmission and reception of electronic signal is carried out between the circuit chip 23 of the electronic key 20 and antenna coil 18 so as to verify ID memorized in the circuit chip 23 with ID memorized in the control unit 60.

If the ID memorized in the circuit chip 23 and the ID memorized in the control unit 60 coincide with each other, the control unit generates an engine driving permission signal and sends a lock release signal to the lock solenoid 8. Consequently, the stopper 9 is changed from a condition shown in FIG. 16A to a condition shown in FIG. 16B so as to release the stopper 9 from the lock groove 10 thereby unlocking the leeve 4.

Figure 10A:
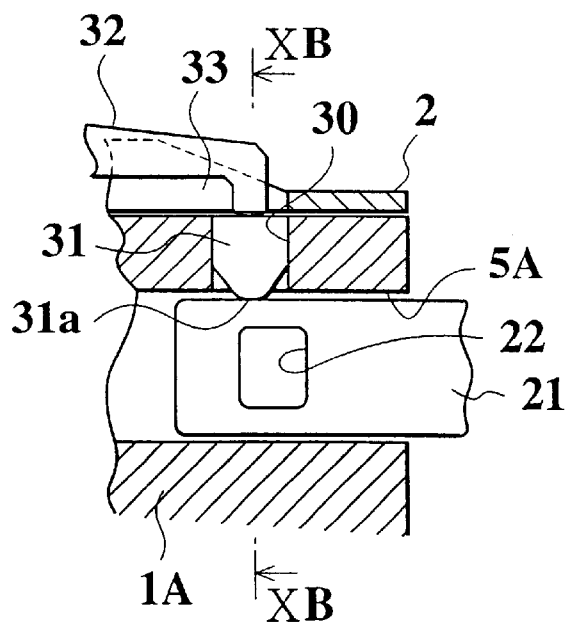
FIG. 10A is a sectional view schematically showing electronic key insertion condition around a second slider disposing portion according to the embodiment and FIG. 10B is a sectional view taken along the lines XB to XB of FIG. 10A.
Figure 10B:
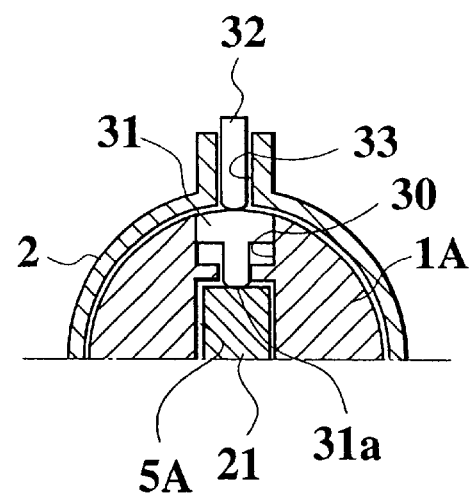

If the electronic key 20 is inserted into the key insertion hole 5A, as shown in FIGS. 10A and 10B, the second slider 31 is slid to push up an end of the second check lever 32, so that the lock member of a steering shaft (not shown) is turned into a condition in which it is capable of being unlocked.

Figure 16A:
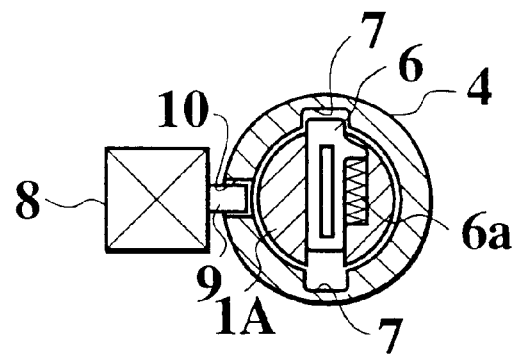
FIGS. 16A to 16C are operating condition diagrams showing a relation between the key cylinder and sleeve according to the embodiment.
Figure 16B:
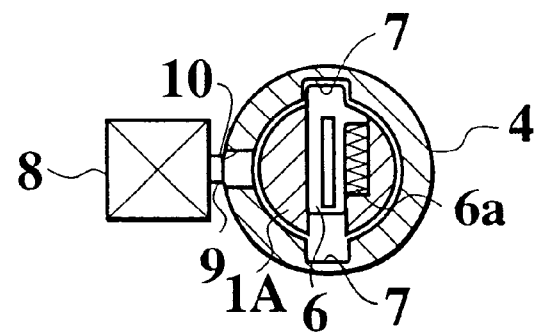

When the electronic key, 20 is inserted into the key insertion hole 5A like this, as shown in FIG. 16B, an end of the tumbler 6 of the key cylinder 1A engages the tumbler engaging groove 7 of the sleeve 4 by a spring force of the tumbler spring 6a. Thus, when the electronic key 20 is rotated, the key cylinder 1A is rotated integrally with the sleeve 4, so that the lock on the steering shaft by the lock member is released.

If the ignition switch 62 is turned ON (starter switch is actuated) by rotating the key cylinder 1A, the control unit 60 sends a driving permission signal to the engine driving control unit 61 to start the engine.

If a supply of electric power to the control unit 60 is disabled because the battery goes dead or other reason, unlocking operation of the lock solenoid 8 by the electronic key 20 is disabled. Therefore, the steering shaft remains locked so that the steering operation is disabled.

Figure 16C:
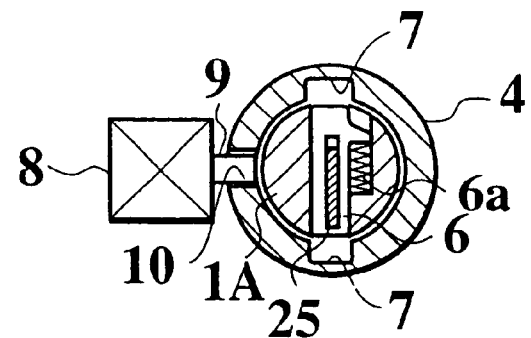

However, in such a case, when, as shown in FIG. 16C, the key plate KP of the mechanical key 25 or the IMMOBI key 25A incorporating the circuit chip 23 in its key head is inserted into the mechanical key insertion hole 5B of the key cylinder 1A, the tumbler 6 is submerged into the key cylinder 1A so as to release an engagement with the sleeve 4, so that the rotation of the key cylinder 1A is made free. At the same time, the second slider 31 is slide by the mechanical key 25 or 25A so as to push an end of the second check lever 32. Consequently, the lock member is turned into a condition in which it is capable of being unlocked by the other end.

Thus, by rotating the key cylinder 1A by means of the mechanical key 25 or 25A, the lock on the steering shaft (not shown) can be released, so that the steering operation is enabled. Thus, it is possible to cope with an emergency or the like.

When the engine is started up by means of the electronic key 20 as described above, by inserting the insertion portion 21, the first slider 12 and the second slider 31 are slide as shown in FIGS. 11A and 11B, FIGS. 12A and 12B, FIGS. 13A and 13B and FIGS. 14A and 14B with corresponding behaviors of the first check lever 12 and the second check lever 32 and finally, an appropriate insertion condition shown in FIGS. 9A and 9B and FIGS. 10A and 10B is obtained.

That is, the first and second sliders 12, 31 are set to slider operating timings which are shifted appropriately with respect to each other. If the insertion portion 21 is inserted into the key insertion hole 5A, the first slider 12 is actuated early so that a preparation for ID verification is started early.

Then, when it is determined that the IDs coincide with each other, the lock on the key cylinder 1A is released by the lock solenoid 8.

Further, subsequent to the above operation, the second slider 31 is actuated so that an outside end face thereof makes flush with an external peripheral face of a large diameter portion of the key cylinder 1A. Consequently, sliding of the an end of the second check lever 32 to the external peripheral face of the key cylinder is enabled, so that a rotation of the key cylinder 1A is completely permitted.

Thus, by such an operation, it is possible to cope with a quick insertion and rotation of the electronic key 20 sufficiently.

On the other hand, when the electronic key 20 is inserted incompletely such that the insertion portion 21 does not reach the second slider 31 as shown in FIGS. 11A and 11B and FIGS. 12A and 12B, the lock on the key cylinder 1A by the lock solenoid 8 is released by the operation of the first slider 12, an end of the second check lever 32 engages side walls of the groove portion 33 in the cylinder casing 2 and side walls of the second slider hole 30, so as to block a rotation of the key cylinder 1A.

Therefore, by such an operation, it is possible to block an engine startup operation and releasing of the lock on the steering lock based on an incomplete insertion of the electronic key 20 effectively, so that an insertion of the electronic key 20 appropriately can be encouraged.

Figure 11A:
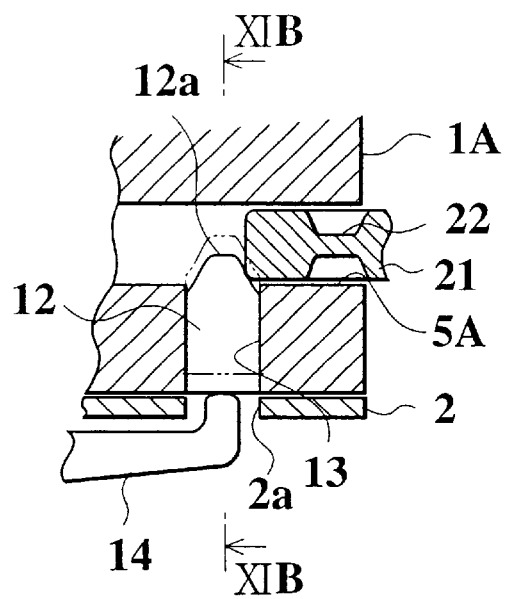
FIG. 11A is a sectional view schematically showing an initial condition of the electronic key insertion process around the first slider disposing portion according to the embodiment and FIG. 11B is a sectional view taken along the lines XIB to XIB of FIG. 11A.
Figure 11B:
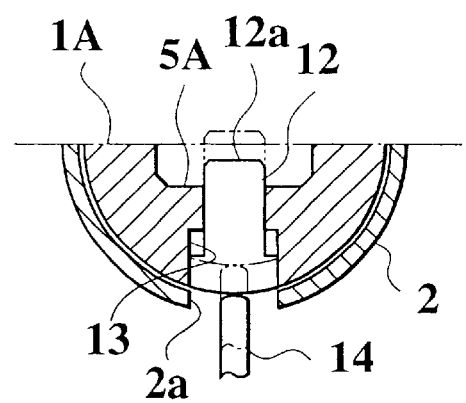
Figure 12A:
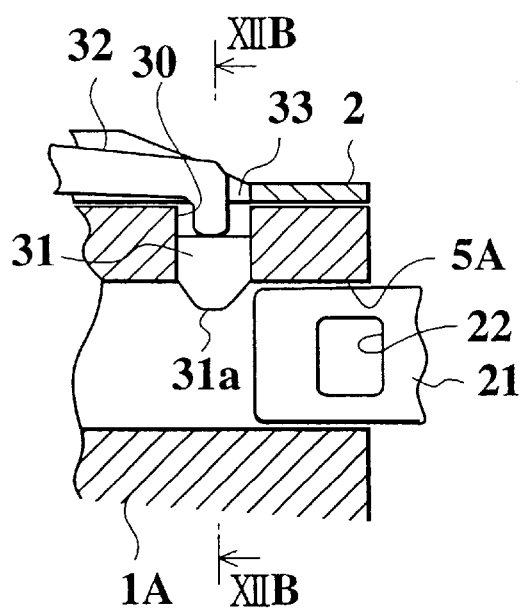
FIG. 12A is a sectional view schematically showing an initial condition of the electronic key insertion process around the second slider disposing portion according to the embodiment and FIG. 12B is a sectional view taken along the lines XIIB to XIIB of FIG. 12A.
Figure 12B:
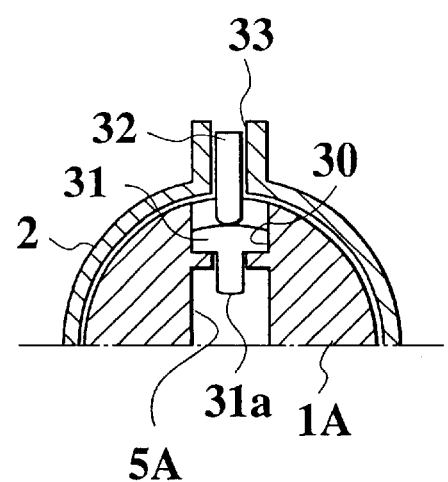

Meanwhile, dotted line of FIGS. 11A and 11B indicates a position of the first slider 12 before the electronic key 20 is inserted.

According to this embodiment also, the insertion portion 21 of the electronic key 20 is provided with the concave portions 22, so that when the electronic key 20 is inserted normally, the tip 12a of the first slider 12 engages the concave portion 22 so as to block the electronic key 20 from being slipped out. At the same time, the outer end face of the first slider 12 makes flush with the external peripheral face of the large diameter portion of the key cylinder 1A.

Figure 13A:
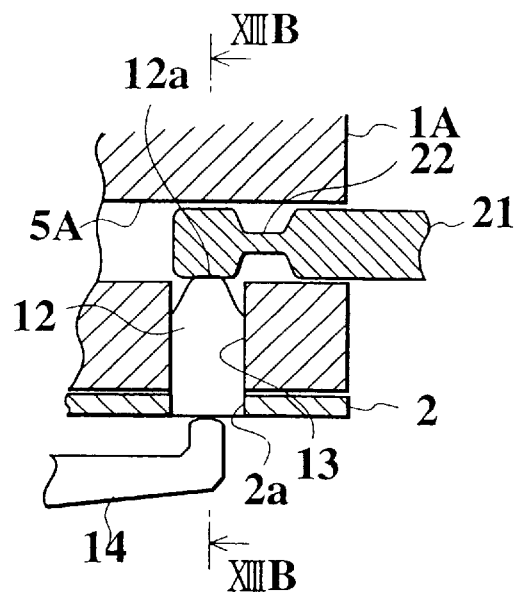
FIG. 13A is a sectional view schematically showing an intermediate period condition of the electronic key insertion process around the first slider disposing portion according to the embodiment and FIG. 13B is a sectional view taken along the lines XIIIB to XIIIB of FIG. 13A.
Figure 13B:
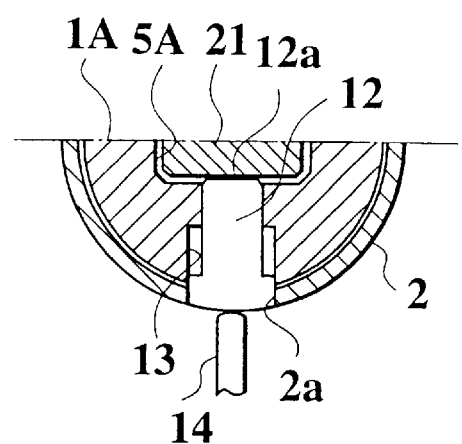
Figure 14A:
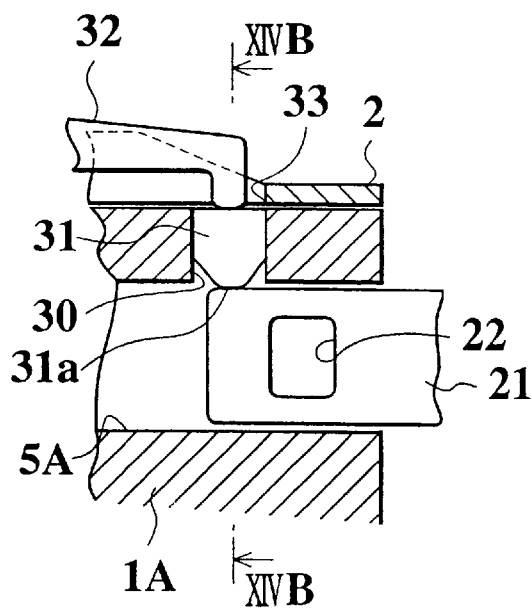
FIG. 14A is a sectional view schematically showing an intermediate period condition of the electronic key insertion process around the second slider disposing portion according to the embodiment and FIG. 14B is a sectional view taken along the lines XIXB to XIXB of FIG. 14A.
Figure 14B:
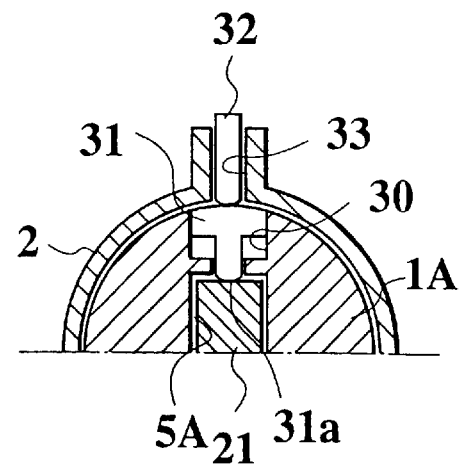

Thus, when the electronic key 20 is inserted incompletely such that as shown in FIGS. 13A and 13B and FIGS. 14A and 14B, the tip portion forward of the concave portion 22 in the insertion portion 21 is caught by the first and second sliders 12, 31, the lock solenoid 8 is operated to release the lock by an operation of the first slider 12 and further, a capture of the key cylinder 1A by an end of the second check lever 32 can be released by an operation of the second slider 31. However, as shown in FIGS. 13A and 13B, the first slider 12 is pushed out of the external peripheral face of the key cylinder 1A by a thick portion forward of the concave portion 22 of the insertion portion 21. As a result, the first slider 12 engages the side face of the first slider hole 13 and the side face of the first opening portion 2a.

Thus, such an operation enables a rotation of the key cylinder 1A effectively even when the electronic key is inserted incompletely, so that an appropriate insertion of the electronic key 20 is encouraged.

Next, a lock apparatus of a third embodiment of the present invention will be described necessarily with reference to Figures referred in the previous embodiments.

According to this embodiment, like the second embodiment, the operating timings of the first slider 12 and the second slider 31 are shifted with respect to each other. The insertion portion 21 of the electronic key 20 is formed in a tapered flat shape as shown in FIG. 5 like the first embodiment. Like reference numerals are attached to the same components of the first and second embodiments and a description thereof is omitted or simplified.

More specifically, according to this embodiment, the insertion portion 21 of the electronic key 20 is formed in a tapered flat shape comprised of a pair of the opposing flat portions 21a and slant portions 21b on both sides.

On the other hand, the key insertion hole 5A of the key cylinder 1A has an opening whose section is rectangular to fit to the sectional shape of the insertion portion 21, so as to facilitate insertion of the electronic key 20 and further, it is formed larger than a tip of the insertion portion 21. An interior of the insertion portion 21 is formed in a tapered flat shape by providing both side faces with slanted walls 5a corresponding to the tapered flat shape of the insertion portion 21. As a result, the key insertion hole 5A makes contact with the insertion portion 21 of the electronic key 20 through the entire faces.

The first slider 12 is disposed at a position corresponding to the opposing flat portion 21a of the insertion portion 21 of the electronic key 20. The opposing flat portion 21a has concave portions 22 which are provided on both the sides thereof while a tip 12a of the first slider 12 engages the concave portion 22.

On the other hand, the second slider 31 is disposed at a position corresponding to the slope portion 21b of the electronic key 21. A guide groove 24 is provided in a portion which contacts the second slider 31 of the slope portion 21b in the direction of key insertion, although a description thereof in detail is omitted. A width between the guide grooves 24, 24 substantially corresponds to the length of the key plate KP in the width direction of the mechanical keys 25, 25A. Thus, the second slider 31 can be actuated securely by either the slope portion 21b of the insertion portion 21 of the electronic key 20 or the side edge of the key plate KP of the mechanical key 25, 25A.

As clearly understood by referring to FIGS. 9A to 16c, because setting of a delay of the slide operation timing in the first and second sliders 12, 31 is the same as the second embodiment, a description thereof is omitted.

Thus, according to the structure of this embodiment, the same effect as the first embodiment can be obtained. Further, because the opening of the key insertion hole 5A is formed larger than the tip portion of the insertion portion 21, the insertion portion 21 can be inserted into he key insertion hole 5A easily.

Because the insertion portion 21 is formed in the tapered flat shape and correspondingly, the key insertion hole 5A is also formed in the tapered flat shape, even when the insertion portion 21 is inserted obliquely as shown in FIG. 2B, the posture of the insertion portion 21 is corrected to an appropriate state by a guide action between the slope portion 21b of the insertion portion 21 and slope wall 5a of the key insertion hole 5A, so that it can be inserted securely.

Therefore, the insertion performance of the electronic key 20 can be improved and an incomplete insertion of the electronic key in the oblique state can be avoided.

Additionally, according to the respective embodiments, the insertion portion 21 of the electronic key 20 is symmetrical with respect to its axis line and formed in a tapered flat block (rectangular solid in the second embodiment) having a rectangular section. A cross section of the key insertion hole 5A is rectangular corresponding to a shape of the insertion portion 21. Thus, the insertion direction of the electronic key 20 is substantially not limited so that its operability can be improved. Further, the side face of the insertion portion 21 can be brought into substantially entire contact with the key insertion hole 5A so that the key cylinder 1A can be rotated securely with a slight operating force.

Further, because the first slider 12 and second slider 31 are disposed such that their slide axis lines intersect with each other, the first and second sliders 12, 31 can be built in reasonably within a limited length of the key cylinder 1A in the axial direction, such that the layout is facilitated.

Further, the second slider 31 is disposed so as to be slid smoothly by a contact with the slope portion 21b of the insertion portion 21 of the electronic key 20 (only a narrow face in the second embodiment) or a contact with the side edge of the key plate KP of the mechanical key 25 or 25A. Thus, even when the key plate KP of the mechanical key 25 or 25A is not subjected to any special machining for operating the second slider 31, both use of the mechanical key 25 and 25A is enabled.

Further, because the mechanical key insertion hole 5B is formed deeper than the key insertion hole 5A and the electronic key 20 and mechanical keys 25, 25A are inserted into the key cylinder 1A and rotated, providing an operator with a feeling of inconvenience is suppressed effectively.

Figure 17:
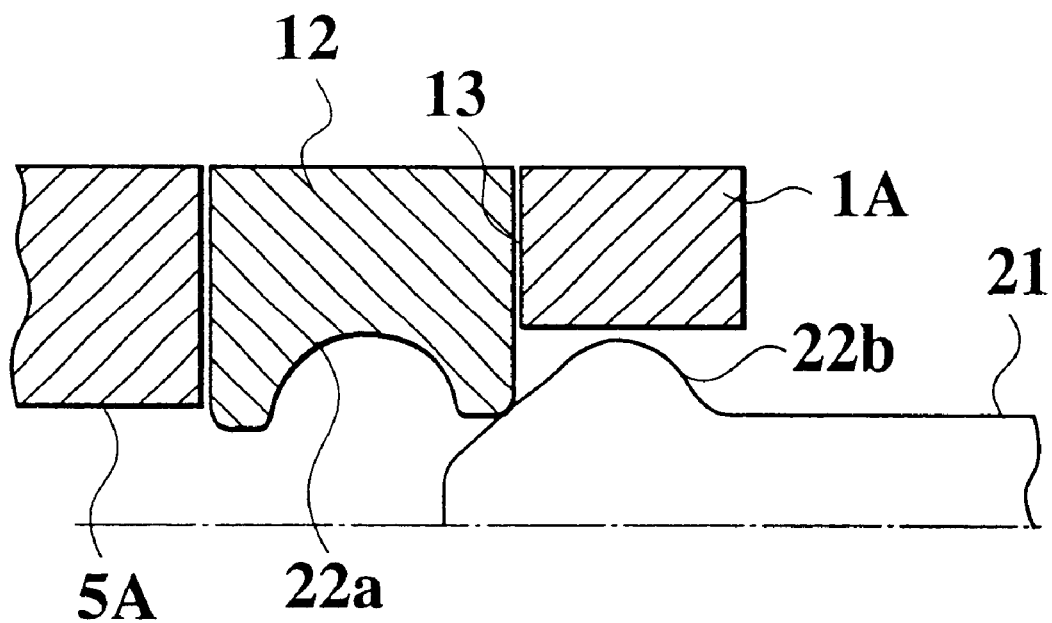
FIG. 17 is a schematic sectional view showing an engaging structure of a first slider of a lock apparatus of an another example of the present invention.
Figure 18:
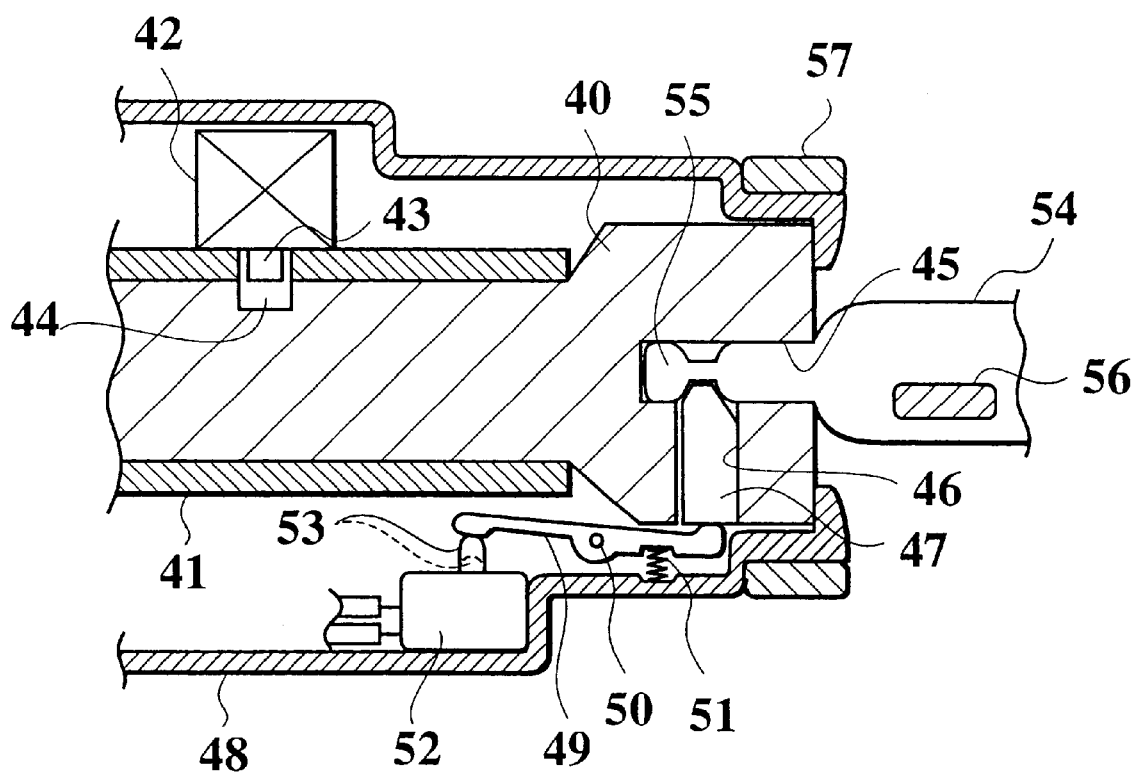
FIG. 18 is a sectional view showing a lock apparatus according to considerations of the inventors of the present invention.
Figure 19:
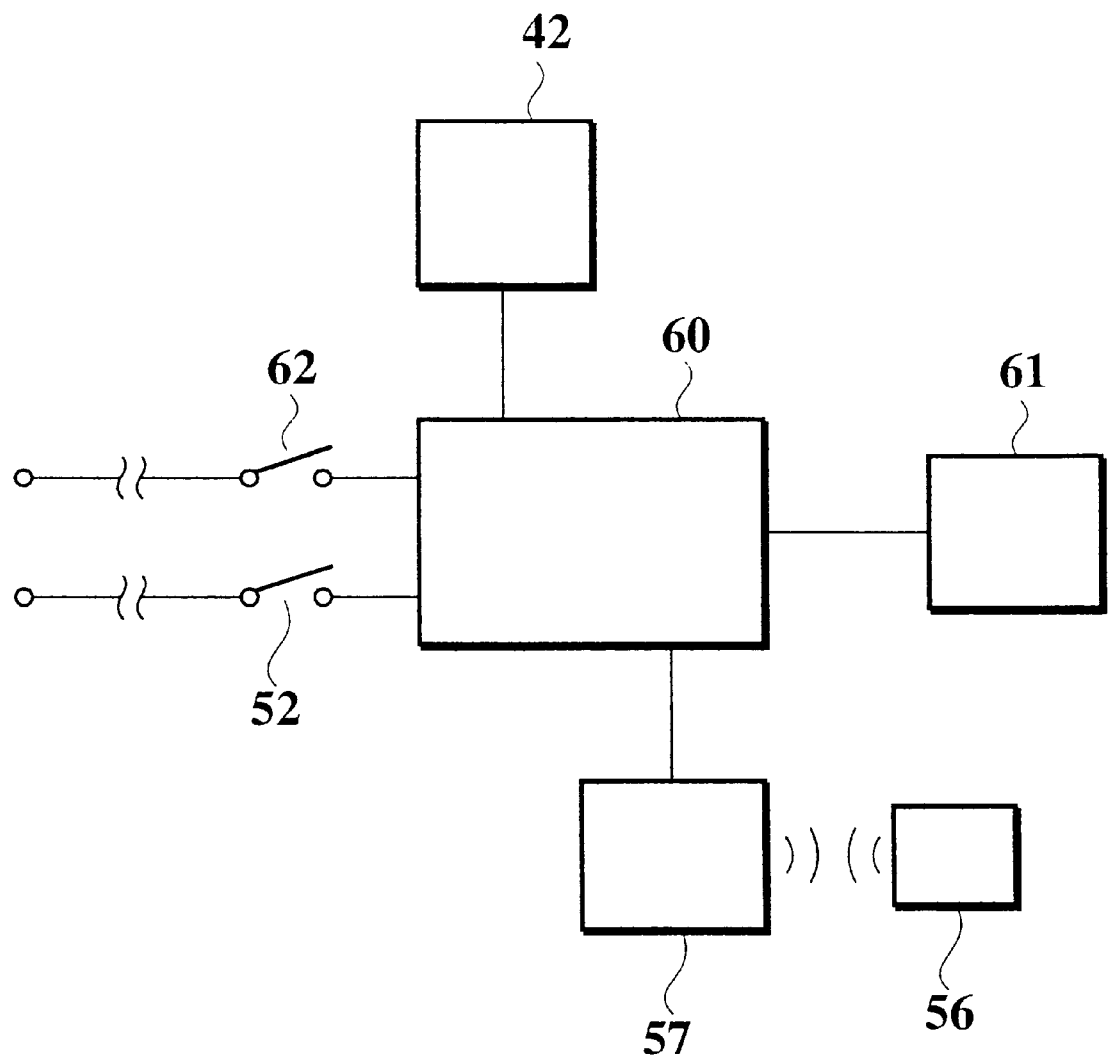
FIG. 19 is a block diagram of the electric circuit according to the considerations.

Although, according to the above described respective embodiments, the concave portions 22 are provided in the insertion portion 21 as an engaging portion for holding the electronic key 20 from slipping out, it is permissible to provide the first slider 12 with a concave portion 22a and the insertion portion 21 with a convex portion 22b as shown in FIG. 17 so as to hold the electronic key 20 from slipping out by an engagement between the concave portion 22a and the convex portion 22b.

Although the respective embodiments have been described by picking up automotive steering lock apparatus as an example, the present invention is not restricted to them, however, it can be applied to lock apparatuses of various constructions to which the electric key is applied.

The entire contents of a Patent Application No. TOKUGANHEI 11-165463 with a filing date of Jun. 11, 1999 in Japan, and those of a Patent Application No.

TOKUGANHEI 11-165451 with a filing date of Jun. 11, 1999 in Japan are hereby incorporated by reference.

Although the invention has been described above by reference to certain embodiments of the invention, the invention is not limited to the embodiments described above. Modifications and variations of the embodiments described above will occur to those skilled in the art, in light of the teachings.

The scope of the invention is defined with reference to the following claims.

What is claimed is:

1. A lock apparatus capable of being locked and unlocked by an electronic key, comprising:
    an electronic key having a circuit chip generating an electronic signal and an insertion portion formed at an end thereof;
    a control unit disposed on the lock apparatus and carrying out transmission and reception of an electronic signal between the electronic key and the control unit so as to perform ID verification, the control unit sending a lock release signal when as a result of the ID verification, an ID of the control unit and an ID of the electronic key coincide with each other;
    a casing disposed on the lock apparatus and having a first opening portion;
    a rotating member disposed rotatably inside the casing:
        a lock actuator receiving the lock release signal from the control unit so as to release a lock on the rotating member with respect to the casing:
            a key insertion hole disposed to the rotating member and capable of transmitting a rotation force of the electronic key to the rotating member when the insertion portion of the electronic key is inserted and engaged therewith;
            a first slider hole going through the rotating member in a direction perpendicular to the key insertion hole from an external peripheral face of the rotating member toward the key insertion hole;
            a first slider inserted into the first slider hole and disposed such that an inner end thereof is protruded into the key insertion hole, an outer end face thereof being submerged from the external peripheral face of the rotating member when the electronic key is not inserted or inserted incompletely, and the first slider being pushed by the insertion portion and slid outward when the electronic key is inserted normally so that the outer end face makes flush with the external peripheral face of the rotating member;
            a first check lever supported rotatably by the casing and in which one end thereof is an operating portion activating the transmission and reception of the control unit for ID verification and the other end makes contact with the outer end face of the first slider through the first opening portion in the casing so as to transmit a sliding motion of the first slider to the one end of the first check lever, while when the rotating member is rotated by the electronic key, the other end of the first check lever is moved from the outer end face of the first slider to the external peripheral face of the rotating member and makes contact with the external peripheral face in slidable;
            a second slider hole going through the rotating member in a direction perpendicular to the key insertion hole from the external peripheral face of the rotating member to the key insertion hole;
            a second slider inserted movably into the second slider hole; and
            a second check lever supported rotatably outside the casing, wherein a block portion is formed in the second slider hole so as to be capable of engaging a side face on one end of the second check lever when the rotating member is rotated, the block portion being located beside the one end of the second check lever when the second check lever is in contact with the external peripheral face of the second slider submerged from the external peripheral face of the rotating member.

2. A lock apparatus according to claim 1, wherein when a predetermined opening angle in a rotation direction of the rotating member is set between a slide axis line of the second slider and a disposition axis line of the one end of the second check lever, a width of a second opening portion in the casing holding the second check lever is set larger than a thickness of the second check lever, so that when the block engages a side face of the one end of the second check lever, the one end of the second check lever is moved swingingly in the second opening portion and a side face of the block is capable of making a facial contact with the side face of the second check lever.

3. A lock apparatus capable of being locked and unlocked by an electronic key, comprising:
    an electronic key having a circuit chip generating an electronic signal and an insertion portion formed at an end thereof;
    a control unit disposed on the lock apparatus and carving out transmission and reception of an electronic signal between the electronic key and the control unit so as to perform ID verification, the control unit sending a lock release signal when as a result of the ID verification, an ID of the control unit and an ID of the electronic key coincide with each other;
    a casing disposed on the lock apparatus and having a first opening portion;
    a rotating member disposed rotabably inside the casing;
    a lock actuator receiving the lock release signal from the control unit so as to release a lock on the rotating member with respecting to the causing;
    a key insertion hole disposed to the rotating member and capable of transmitting a rotation force of the electronic key to the rotating member when the insertion portion of the electronic key is inserted and engaged therewith;
    a first slider hole going through the rotating member in a direction perpendicular to the key insertion hole from an external peripheral face of the rotation member toward the key insertion hole;
    a first slider inserted into the first slider hole and disposed such that an inner and thereof is protruded into the key insertion hole, an outer end face thereof being submerged from the external peripheral face of the rotating member when the electronic key is not inserted or inserted incompletely, and the first slider being pushed by the insertion portion and slid outward when the electronic key is inserted normally, so that the outer end face makes flush with the external peripheral face of the rotating member;
    a first check lever supported rotatably by the casing and in which one end thereof is an operating portion activating the transmission and reception of the control unit for the ID verification and the other end makes contact with the outer end face of the first slider through the first opening portion in the casing so as to transmit a sliding motion of the first slider to the one end of the first check lever, while when the rotating member is rotated by the electronic key, the other end of the first check lever is moved from the outer end face of the first slider to the external peripheral face of the rotating member and makes contact with the external peripheral face in slidable;

a second slider hole going through the rotating member in a direction perpendicular to the key insertion hole from the external peripheral face of the rotating member to the key insertion hole;

a second slider inserted into the second slider hole and disposed such that an inner end thereof is protruded into the key insertion hole, an outer end face thereof being submerged from the external peripheral face of the rotating member when the electronic key is not inserted or inserted incompletely, the second slider being pushed by the insertion portion and slid outward when the electronic key; and a second check lever supported rotatably outside the casing and in which an end thereof is in contact with an outer end face of the second opening portion in the casing, the second check lever engaging a side wall of the second opening portion and a side face of the second slider hole when an external peripheral face of the second slider is submerged into the second slider hole, so as to block a rotation of the rotating member.

4. A lock apparatus according to claim 3, wherein a contact start position between the second slider and the insertion portion is set deeper in the key insertion hole with respect to a contact start position between the first slider and the insertion portion of the electronic key.

5. A lock apparatus according to claim 4, wherein the second slider is located deeper in the key insertion hole with respect to the first slider.

6. A lock apparatus according to claim 4, wherein a portion of the insertion portion, which makes contact with the second slider, of the electronic key is formed in an inclined shape such that a contact start point with the first slider is nearer an opening of the key insertion hole than a contact start point with the second slider in an insertion process of the electric key into the key insertion hole.

7. A lock apparatus according to claim 6, wherein the insertion hole and the insertion portion of the electronic key are formed symmetrically with respect to axis line of each thereof, while a slide axis line of the first slider is set in a direction perpendicular to the slide axis line of the second slider.

8. A lock apparatus according to claim 1, wherein the rotating member has a key cylinder; the key insertion hole is formed in the key cylinder, a mechanical key insertion hole in which a flat mechanical key is to be inserted is formed at a deeper position continuously with the key insertion hole; and tumblers related to the mechanical key insertion hole are provided so as to advance from and retract to the external peripheral face of the key cylinder corresponding to removal and insertion of the mechanical key, and wherein a sleeve is disposed around an external face of the key cylinder such that the lock actuator engages or disengages from the sleeve while the sleeve engages the tumblers so as to be capable of rotating integrally with the key cylinder when the mechanical key is not inserted, the engagement with the lock actuator being released when as a result of the ID verification, the ID of the control unit and the ID of electrical key coincide with each other, so as to allow a rotation of the sleeve integrally with the key cylinder.

9. A lock apparatus according to claim 8, wherein the key insertion hole and the insertion portion of the electronic key are formed symmetrically with respect to each of axis lines thereof; a slide axis line of the first slider is set in a direction perpendicular to a slide axis line of the second slider; engaging portions of the electronic key to the first slider are concave portions formed at symmetrical positions opposing to each other; a thickness between the concave portions is set substantially the same as a thickness of the key plate of the mechanical key; the second slider is disposed at a position in which the second slider is capable of contacting a side edge of the key plate of the mechanical key; and a width of a portion of the insertion portion to be in contact with the second slider substantially corresponds to a width of the key plate.

10. A lock apparatus according to claim 9, wherein the insertion portion of the electronic key is formed in a tapered flat shape comprised of a pair of opposing flat portions and slope portions on both sides; the concave portions are provided in the opposing flat portions; an opening of the key insertion hole is formed rectangular corresponding to a sectional shape of the insertion portion and larger than a size of the insertion portion; and an interior of the key insertion hole is formed in a tapered flat shape in which both side walls are slope walls corresponding to the tapered flat shape of the insertion portion, thereby a rotation force of the electronic key inserted into the key insertion hole being transmitted to the key cylinder through substantially entire facial contact with the opposing flat portions, and wherein the first slider is disposed at a position corresponding to the opposing flat portions of the insertion portion of the electric key and the second slider is disposed at a position corresponding to the slope portions of the insertion portion.

11. A lock apparatus according to claim 1, wherein the inner end of the first slider engages an engaging portion formed in the insertion portion of the electronic key so as to hold the electronic key.

12. An electronic lock apparatus in which transmission and reception of an electronic lock apparatus in which transmission and reception of an electronic signal is carried out between a circuit chip that generates an electronic signal and provided in an electronic key and a control unit that is disposed on the lock apparatus so as to perform ID verification, and when as a result of the ID verification, an ID of the control unit and an ID of the electronic Key coincide with each other, a lock release signal is sent from the control unit to a lock actuator so that a rotating member of the electric lock apparatus becomes capable of being unlocked to enable a rotation of the rotating member by the electronic key, the electronic lock apparatus comprising:

a casing accommodating the rotating member rotatably;

a key insertion hole disposed to the rotating member and capable of transmitting a rotating force of the electronic key to the rotating member when an insertion portion of the electronic key is not inserted or inserted incompletely, and the slider being pushed by the insertion portion and slid outward when the electronic key is inserted normally, so that the outer end face makes flush with the external peripheral face of the rotating member; and a check lever supported rotatably outside the casing and in which one end thereof is an operating portion activating the transmission and reception of the control unit for the ID verification and the other end makes contact with the outer end face of the slider through an opening portion in the casing so as to transmit a sliding motion of the slider to the one end of the check lever, while when the rotating member is being rotated by the electronic key, the other end of the check lever is moved from the outer end face of the slider to the external peripheral face of the rotating member and makes contact with the external peripheral face in slaidable;

a second slider hole going through the rotating member in a direction perpendicular to the key insertion hole from the external peripheral face of the rotating member to the key insertion hole;

a second slider inserted movably into the second slider hole; and a second check lever supported rotatably outside the casing wherein a block portion is formed in the second slider hole so as to be capable of engaging a side face on one end of the second check leer when the rotating member is rotated, the block portion being located beside the one end of the second check lever when the second check lever is in contact with the external peripheral face of the second slider submerged form the external peripheral face of the rotating member.

13. A lock apparatus according to claim 4, wherein the inner end of the first slider engages an engaging portion formed in the insertion portion of the electronic key so as to hold the electronic key.

* * * * *